United States Patent [19]

Miller

[11] Patent Number: 4,610,071
[45] Date of Patent: Sep. 9, 1986

[54] METHOD OF FORMING FOAM FILLED BASEBALL OR SOFTBALL

[76] Inventor: Richard E. Miller, 6119 Cowan Mill Rd., Douglasville, Ga. 30135

[21] Appl. No.: 715,387

[22] Filed: Mar. 25, 1985

Related U.S. Application Data

[63] Continuation-in-part of Ser. No. 441,566, Nov. 15, 1982, Pat. No. 4,568,083.

[51] Int. Cl.$^4$ .............................................. B23P 25/00
[52] U.S. Cl. ........................................ 29/458; 29/460; 29/463; 156/73.5; 264/46.5; 264/68; 273/58 A; 273/60 A; 273/60 B; 273/DIG. 22; 273/DIG. 8
[58] Field of Search ............... 29/458, 460, 463; 273/60 A, 60 R, 58 B, 58 A, 58 BA, 60 B, DIG. 4, DIG. 11, DIG. 22, 235 R, 218; 156/73.5; 264/68, 46.5

[56] References Cited

U.S. PATENT DOCUMENTS

| | | | |
|---|---|---|---|
| 1,636,518 | 7/1927 | Lannom, Jr. ................. | 273/60 B |
| 2,956,611 | 10/1960 | Jendrisak et al. ............ | 156/73.5 |
| 3,070,479 | 12/1962 | Meyer ......................... | 273/58 B X |
| 3,120,570 | 2/1964 | Kennedy et al. ............. | 264/46.5 |
| 3,132,417 | 5/1964 | Irwin .......................... | 29/463 X |
| 3,463,843 | 8/1969 | Taylor et al. ................ | 264/68 |
| 3,652,088 | 3/1972 | Marsh ......................... | 273/DIG. 4 X |
| 3,940,145 | 2/1976 | Gentilyomo .................. | 273/218 |
| 4,203,941 | 5/1980 | Brooker ...................... | 273/60 B X |
| 4,211,407 | 7/1980 | Tomar ........................ | 273/DIG. 11 X |
| 4,367,873 | 1/1983 | Chang et al. ................ | 273/DIG. 4 X |

Primary Examiner—Charlie T. Moon
Attorney, Agent, or Firm—James B. Middleton

[57] ABSTRACT

A game ball for playing baseball or softball, and the method for making the ball. The ball is formed of a hollow plastic shell filled with an expanded plastic material, and a cover completes the ball. The weight of the ball is provided by the weight of the shell, the expanded plastic filling the shell, and the cover. The COR, sound, and feel off the bat are provided almost entirely by the plastic shell. The material of the shell is an ionomer or a polyolefin, and the preferred material is an ethylene acid copolymer, the material for the shell being selected to have a hardness in the range of Shore D 30 to 65. The expanded plastic filling the shell may be any self-initiating material. The method for forming the ball is to mold two hemispheres, place a liquid mix for forming the expanded plastic into the lower hemisphere, weld the upper hemisphere to the lower hemisphere, the upper hemisphere having a vent hole at the top, and let the shell rest while the material expands to fill the shell. The cover is then placed over the shell to complete the ball.

6 Claims, 4 Drawing Figures

METHOD OF FORMING FOAM FILLED BASEBALL OR SOFTBALL

CROSS-REFERENCE TO RELATED APPLICATIONS

This application is a continuation-in-part of the copending application of the same inventor titled "Game Ball and Method of Making Same" filed Nov. 15, 1982, and having Ser. No. 441,566 now U.S. Pat. No. 4,568,983.

INFORMATION DISCLOSURE STATEMENT

Baseballs and softballs have conventionally been formed by providing a spherical core of ground cork, kapok, feathers or other such material, the material being tightly packed under pressure and held by a binder. A winding of string or yarn is then placed over the core to provide the strength and resilience for the ball, and the ball is completed by sewing a cover of leather or the like over the windings.

Problems with the prior art balls have long been recognized. The balls vary widely in size and weight so that, during manufacture, many balls must be rejected. If the size of the core is too far from standard a cover will not fit over the core, and if the weight is not within the accepted weight range, the ball will not be acceptable for playing baseball or softball.

The prior art balls have generally had a relatively short playing life. The cover and windings may split from normal play, or the ball may become so badly non-spherical that playing characteristics are unacceptable. Additionally, the prior art balls will soak up water when exposed to wet, or even damp, conditions. When the ball becomes water soaked, the weight of the ball is greatly increased and the resilience of the ball is decreased.

With the vast technology in plastic materials, there have been several balls formed of plastics, but such balls have been generally formed by molding a complete core using an expanded plastic material, covering this core with string, other plastics etc., then completing the ball by covering with the conventional leather cover. None of these prior plastic balls has been completely successful commercially. While balls have been successfully made that are literally useable in baseball and softball games, the balls have been unable to meet the more rigorous standards set for regulation ballgames.

One of the very important standards for a baseball or softball game is the coefficient of restitution (COR). In determining the COR, a ball is propelled against a standard surface at 80 miles per hour, and the speed of rebound is determined. There are two standards set for balls, one for restricted flight balls and one for unrestricted flight balls. Restricted flight balls must have a COR of no more than 0.44; unrestricted flight balls must have a COR of no more than 0.48; and a COR higher than these will result in an unofficial ball, not useable in official ball play.

While the prior art balls having a core made of cork or the like have been widely favored, some of the above mentioned problems militate against continued use of cork. While cork is favored for the "feel off the bat", which is the expression normally used to indicate the feel to the player as the energy is transferred from the bat to the ball, the COR of a cork ball is not high enough for the game as it is played today. Players in today's game insist on a ball that has a slightly higher COR than has been previously found in balls, but the COR must not be so high as to become hazardous, and now must stay within the above stated official limits.

One prior art ball has been made with a core of expanded ethylene vinyl acetate (EVA), but shch a ball has consistently had a COR too high to meet the standards, so such a ball cannot be used in official play. The EVA also takes a compression set. A ball has been made of an expanded polyurethane. This ball is disadvantageous both because the polyurethane will take a compression set, and because the consistency of the ball will change with temperature. Thus, when the weather is very hot, the polyurethane ball tends to lose its sound when hit, and has a reduced COR. On the other hand, when the weather is extremely cold the polyurethane ball becomes so hard as to dent a metal bat. Another prior art ball has been formed by producing a core of foamed polyvinyl chloride (PVC), then dipping this core into an ethylene copolymer and providing a rough surface, followed by a string winding and finally a leather cover. Even if such a ball provides proper characteristics to be an official baseball or softball, the procedure for manufacturing the ball will be quite expensive and difficult to control accurately.

SUMMARY OF THE INVENTION

This invention relates generally to gameballs, and is more particularly concerned with a baseball or softball formed of a hollow sphere with foamed material filling the sphere, and having a conventional cover directly over the sphere.

The present invention provides a baseball or softball through the steps of molding two hemispheres having the desired wall thickness. Components for providing an expanded plastic material are dispensed into one hemisphere, and the two hemispheres are welded together. Following welding, the ball is set aside to allow expansion of the plastic material, vent means being provided for escape of gases generated during foaming. A cover is sewn over the sphere after expansion of the plastic material is completed. The hemispheres are sized to produce a ball having the desired circumference, and the wall thickness and the expanded plastic filling are selected so the final ball will have a weight falling within the accepted weight range for baseballs and softballs. The hemispheres can be molded of virtually any of the polyolefins, though the choice is somewhat restricted when an official game ball is desired. The preferred form of the invention utilizes an ethylene acid copolymer, this particular resin available with the desirable characteristics to produce an official ball.

BRIEF DESCRIPTION OF THE DRAWINGS

These and other features and advantages of the present invention will become apparent from consideration of the following specification when taken in conjunction with the accompanying drawings in which.

DETAILED DESCRIPTION OF THE EMBODIMENT

Those skilled in the art will recognize that gameballs have previously been designed by attempting to improve either the core or the string winding of the ball. Problems in durability have always resulted in additional work to give the core integrity, and it is this tendency that created the foamed plastic cores.

The present inventor has recognized that game balls break down first within the core. As the ball is hit the core material forced rather nearly flat, then the core re-expands to its original shape. This action causes pulverization of the center of the core. Once the core is partly pulverized, the core as a whole will crack, and the ball becomes non-spherical. In this manner, the ball will lose the sound, the COR, and finally its usefulness in a game.

This pulverization of the core takes place for all cores, whether formed of kapok, cork or the like, or, of expanded polyurethane, EVA or the like.

Another disadvantage to the usual design of a game ball is that various techniques to produce the ball cores do not yield accurate dimensions. Both the circumference and the weight of balls are subject to considerable variation even though great effort is made to control the dimensions. It should be noted, however, that the molded expanded plastics further expand, then contract after being removed from the mold, and the final circumference cannot be accurately controlled. Cork is purchased on the basis of a given specific gravity, but one batch may have a very high water content while another batch may have a much lower water content.

Thus, it has now been recognized that the solution to all the problems is to create an improved ball without trying to improve the core. Attention is therefore directed to the present solution.

Figure 1:
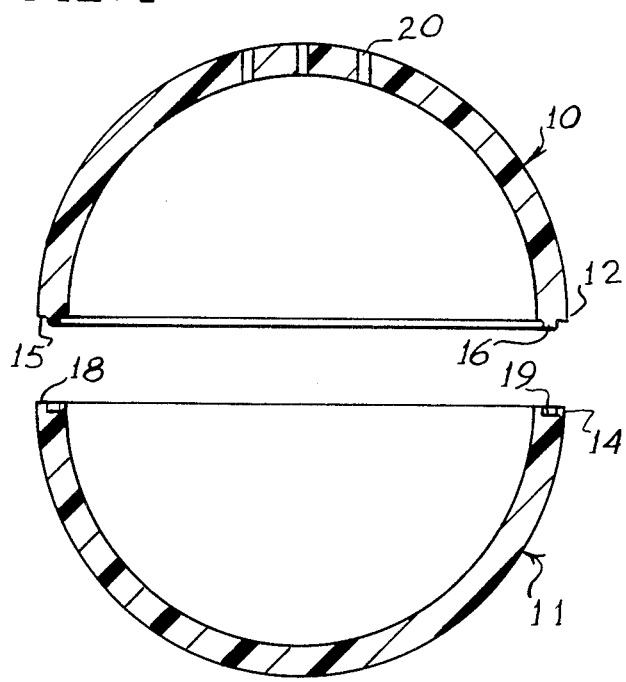
FIG. 1 is a cross-sectional view showing hemispheres ready to be welded together for forming a ball core.

Referring now more particularly to the drawings, and to that embodiment of the invention here presented by way of illustration, FIG. 1 shows two hemispheres designated at 10 and 11, the hemispheres 10 and 11 being shown in diametrical cross-section. For convenience in terminology, the hemisphere 10 will be referred to as the upper hemisphere and the hemisphere 11 will be referred to as the lower hemisphere. Though the distinction is important during manufacture, the completed ball will be spherical, and any portion thereof may be uppermost.

As is shown in FIG. 1 of the drawings by way of example, the circumference of both the hemispheres 10 and 11 at their equators 12 and 14 will be equal, and will be within the range set for gameballs. For official baseballs the balls must have a circumference from $8\frac{7}{8}''$ to $9\frac{1}{4}''$, and for official softballs the balls must have a circumference from $11\frac{7}{8}''$ to $12\frac{1}{4}''$. Since the ball shown in FIG. 1 is a softball, the circumference is preferably 11 9/16. Remembering that a cover must be added, the small core prevents an oversize ball even if the cover happens to be exceptionally thick.

It will be noted in FIG. 1 that the hemisphere 10 has a uniform wall thickness; however, the lower flat surface 15 is provided with an extending tongue 16. Similarly, the upper flat surface 18 of the lower hemisphere 11 is provided with a groove 19. The dimensions of the tongue 16 and groove 19 are such that the two hemispheres 10 and 11 can be placed together and the tongue 16 will be received within the groove 19, and the flat surfaces 15 and 18 will be uniformly contiguous.

Figure 2:
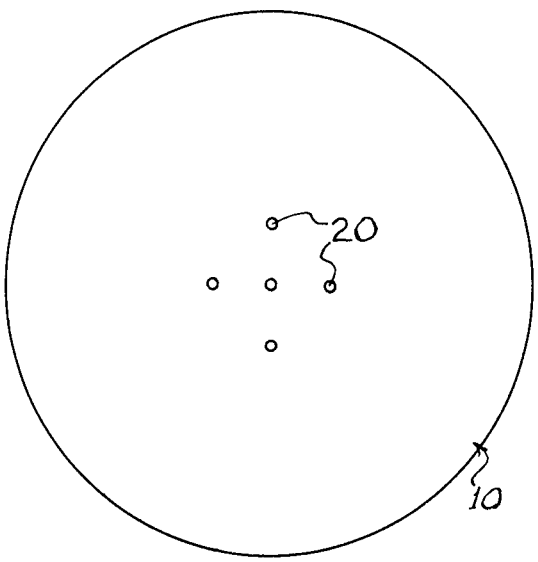
FIG. 2 is a top plan view showing the vent holes in the upper hemisphere illustrated in FIG. 1.

Looking now at FIG. 2 in conjunction with FIG. 1, it will be seen that there is a plurality of vent holes 20 generally at the apex of the upper hemisphere 10. The number and precise location of these vent holes 20 are considerably variable, but the vent holes 20 as here shown comprise five holes 20, each having a diameter of about one-sixteenth inch. Four holes are arranged equidistantly around a bolt circle having a diameter of about three-fourths inch, the fifth hole being located at the center of the bolt circle. These holes, and the use thereof, will be discussed further hereinafter.

In making a ball of many of the polyolefins, the hemispheres 10 and 11 may be weldable by a solvent type adhesive or the like. In this event, the tongue and groove 16 and 19 will provide convenient alignment means for adhering the two hemispheres. In the preferred form of the invention, the hemispheres will be welded by spin welding. For spin welding, the lower hemisphere 11 will be held in place, and the upper hemisphere 10 will be urged against the lower hemisphere 11 while the upper hemisphere is rotated at high rpm. The heat generated at the junction is sufficient to weld the two hemisphere together. Such a welding technique is well known to those skilled in the art, and no further description is thought to be necessary. Nevertheless, it will be understood that, in such a process, the tongue and groove 16 and 19 will provide a convenient alignment means so the two hemispheres 10 and 11 are properly aligned when they are welded.

Because the ball of the present invention has a relatively thin wall, there is an additional consideration when the hemispheres are to be spin welded. Realizing that, for spin welding, the lower hemisphere must be clamped in place, and the upper hemisphere is held, rotated at an extremely high speed, and forced against the lower hemisphere, it has been found that the hemisphere walls must have a minimum stiffness or a proper weld will not be achieved.

In using "Nucrel" ethylene acid copolymer for the hemispheres, it has been found that a hardness of 35 Shore D assures the minimum stiffness required, though a hardness of 40 is preferred. It should be understood, however, that it is not hardness per se that is critical, but stiffness. Hardness and stiffness usually follow each other in plastic and rubber materials, but it is the quality of stiffness that is important. This would be the equivalent of the "shear modulus" in mechanics.

Figure 3:
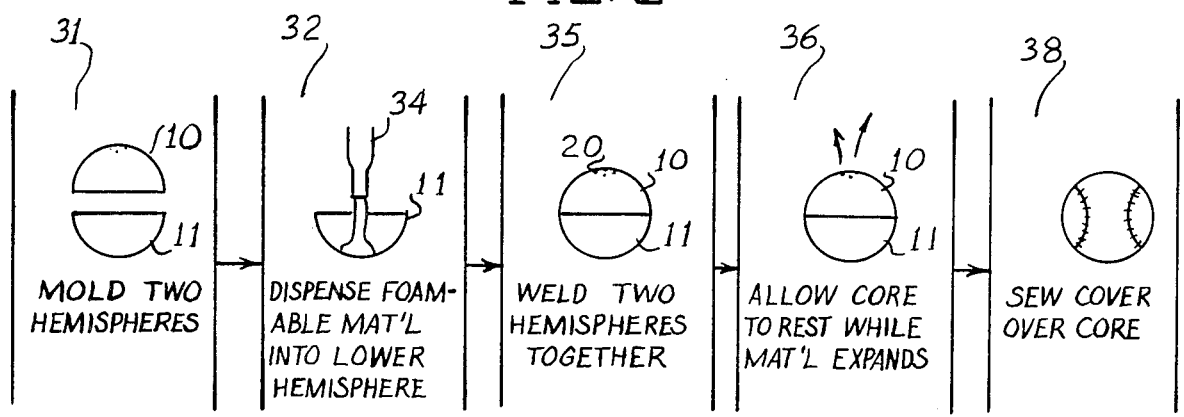
FIG. 3 is a schematic illustration showing the process for making the ball shown in FIGS. 1, 2 and 4; and, FIG. 4 is an enlarged, fragmentary cross-sectional view of the completed ball.
Figure 4:
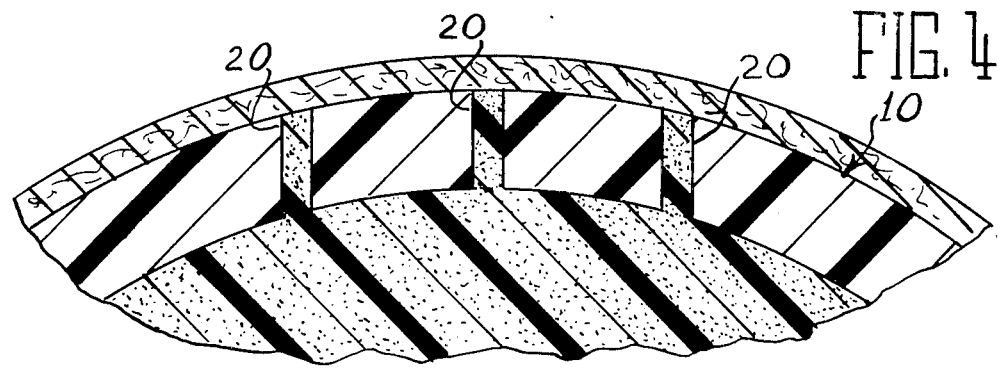

Attention is now directed to FIG. 3 of the drawings for a discussion of the process for forming the ball of the present invention.

The first step is designated at 31, and includes the step of molding the two hemispheres as shown in FIG. 1 of the drawings. The two hemispheres will preferably be injection molded in order to obtain the close tolerances.

From the above discussion, it should be understood that one will slect a resin to be used for the shell. The outside circumference of the ball will be selected, based on standards for the game involved, and one may have to mold a few shells to determine the thickness desired. In the present ball, the shell should provide the strength, the COR, and the sound desired. The foamed plastic filling the ball is for weight only, though a small percentage of the sound may be due to the filling for the shell. Thus, one skilled in the art could try a few thicknesses, and quickly determine the desired thickness for the ball wanted.

By way of example, the ball shown in the drawings is a softball, the shell being molded of "Nucrel" ethylene acid copolymer having a hardness of Shore D 40. The thickness of the shell wall is about 3.6 mm. The hemispheres weld easily on a spin welder, and the shell has the strength necessary, the sound is good and the COR is precisely what is desired. The tongue and groove 16 and 19 measure about 1 mm wide and 1 mm deep.

The second step designated at 32 includes the step of placing the lower hemisphere 11 into the spin welder, and dispensing components of an expandable plastic material into the lower hemisphere 11. The nozzle 34 shown is of a well known design as used for polyurethanes and the like.

While other materials may be used, a polyurethane is admirably adapted for use with the present invention. The polyurethanes can be self-initiating and water blown, so the liquid material can be placed into the lower hemisphere 11, and the upper hemisphere 10 can immediately be put into place.

Still utilizing a self-initiating system as in the polyurethanes, one could also use "poly b d" resins supplied by ARCO Chemical Company, a division of Atlantic Richfield Company. This material is a polybutadiene, but it is hydroxyl terminated so it will react with an isocyanate. Silicones can now be foamed, and these and numerous other materials may be used as the filling material for the ball of the present invention.

The circumference of the core will of course have been selected to mold the hemispheres 10 and 11, and this is discussed above. The thickness of the shell wall will also have been selected. Once the shell is set, the weight will be known. The weight of the filling material must then be determined by simply subtracting the weight of the shell from the total ball weight. The appropriate weight-quantity of the materials for the filling will thus be placed into the hemisphere 11 at step 32.

In the exemplary ball herein shown and discussed, the shell, which has been previously described, will weigh 4 ounces, and the total ball core weight sought is 6 ounces. Obviously, 2 ounces of polyurethane fills the shell.

Turning to the step 35, it will be understood that, as soon as the material for the filling has been placed into the hemishpere 11, the hemisphere 10 will be matted with the hemisphere 11 and welded in place. Here it will be noted that the lower hemisphere 11 is impervious, and the upper hemisphere 10 is provided with the vent holes 20. The vent holes 20 allow escape of gases as the material within the shell reacts and expand.

The actual process of spin welding requires less than one second to weld a ball; therefore, after the ball is welded at step 35, the ball is set aside as indicated at 36 while the material within the shell expands. It is important that the completed shell be held with the upper hemisphere 10 upward, and the vent holes 20 uppermost so the material will expand uniformly and avoid the formation of gas pockets within the sphere.

Finally, as shown at step 38 a cover is sewn over the core, and the ball is complete.

If the hemispheres 10 and 11 of the completed ball are made of a sufficiently tough material such as "Surlyn" ionomer or "Nucrel" ethylene acid copolymer (E. I. duPont de Nemour & Co.), the core will last virtually indefinitely. Since the standard in the industry is to produce a ball that will withstand 200 blows of a bat, the completed ball will far surpass the minimum standards of manufacture.

In producing a ball in accordance with the present invention, it must be realized that the COR of the ball can be changed by changing the hardness of the material utilized. Using "Nucrel" ethylene acid copolymer, a particular resin is available for the particular hardness desired. Thus, if an unrestricted flight ball is desired, the COR must be no more than 0.48; and, to produce a ball that is most satisfying to the players, the COR should approach 0.48 as closely as possible. By using a "Nucrel" resin having a Shore D of 56 the desired COR may be produced. If a restricted flight ball is to be produced, the COR should be 0.44, and a "Nucrel" resin having a Shore D of 35 will produce such a ball.

In view of the above, it will be understood that a ball made in accordance with the present invention is very easy to manufacture since the hemispheres can be injection molded so dimensional tolerances can be held very close. The particular resin for making the ball can be selected, and of course numerous variations can be made within a given resin. Fillers such as glass or the like can be utilized for greater hardness, and other fillers such as various forms of rubber or the like can be utilized to make the material softer. The material will be adjusted for the desired hardness, the hardness ranging from about Shore D 30 to 65.

While the ethylene acid copolymer resin such as the Dupont "Nucrel" is the preferred resin for a ball made in accordance with the present invention, virtually any of the polyolefins can equally well be used. It is important to avoid the use of styrene since styrene absorbs energy, and will so severely reduce the COR as to be completely unacceptable. It should also be recognized that, in the above identified copending application, the hemispheres are molded of "Surlyn" ionomer resin, and that disclosure is incorporated herein by reference.

It will therefore be understood by those skilled in the art that the present invention provides a baseball or softball having the maximum desired COR, and it is well within the scope of the present invention to maintain the COR within the standards set in the game so the ball can be used for official play.

While the ball of the present invention comprises a shell filled with an expanded plastic material, the ball overcomes the above identified problems with such balls in that the shell of the present invention provides the strength, the sound, the COR, and even the feel off the bat. The foamed center of the ball adds weight but has almost no other function. As a result, the foamed material may become pulverized and severely weakened, but the ball will be substantially as playable as a new ball. As a result, the ball of the present invention will sell in a market for which there is great demand, which is a ball having a foamed plastic core. Nevertheless, the foamed plastic is not relied on for strength, sound, COR or other playable characteristics of the ball.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as defined in the appended claims.

I claim:

1. A method for making a game ball for playing a game of baseball or softball, said ball including a ball core, and a cover of leather or the like covering said ball core, the completed ball having a first diameter equal to a standard diameter in the game, said core having a second diameter equal to said first diameter less the thickness of said cover, and wherein said ball has a coefficient of restitution substantially at the coefficient of restitution set for the game, said ball has a sound when hit acceptable for the game, said ball has a weight within the standards set for the game, and said ball has a feel off the bat acceptable for the game, said method comprising the steps of molding an upper hemisphere having a diameter equal to said second diameter, said upper hemisphere being hollow and having a wall thickness, and defining a plurality of vent holes through said wall thickness generally at the apex, molding a lower hemisphere having a diameter equal to said second diameter, said lower hemisphere being hollow and having a wall thickness equal to said wall thickness of said upper hemisphere, depositing a quantity of material for forming an expanded plastic into said lower hemisphere, welding said upper hemisphere to said lower hemisphere, allowing the welded hemispheres to rest during expansion of said quantity of material, and covering the welded hemispheres with said cover.

2. A method for making a game ball as claimed in claim 1, wherein the steps of molding said hemispheres is accomplished by molding of a plastic material selected from the group consisting of ionomer resin and the polyolefins that have a hardness in the range of Shore D 30 to Shore D 65.

3. A method for making a game ball as claimed in claim 2, wherein the step of depositing a quantity of material includes depositing a weight quantity such that the final weight of the expanded plastic plus the weight of said welded hemispheres plus the weight of said cover is equal to the said weight within the standards set for the game.

4. A method for making a game ball as claimed in claim 3, wherein the said step of welding upper hemisphere to said lower hemisphere is carried out by spin welding.

5. A method for making a game ball as claimed in claim 4, wherein said hemispheres are molded of ethylene acid copolymer.

6. A method for making a game ball as claimed in claim 4, and including the steps of molding a tongue extending downwardly from said upper hemisphere, molding a groove into said lower hemisphere, and inserting tongue into said groove for carrying out the step of welding said hemispheres together.

* * * * *